US008733690B2

(12) United States Patent
Bevirt et al.

(10) Patent No.: US 8,733,690 B2
(45) Date of Patent: May 27, 2014

(54) LIGHTWEIGHT VERTICAL TAKE-OFF AND LANDING AIRCRAFT AND FLIGHT CONTROL PARADIGM USING THRUST DIFFERENTIALS

(75) Inventors: Joeben Bevirt, Santa Cruz, CA (US); Jeffrey K. Gibboney, Menlo Park, CA (US); David D. Craig, Santa Cruz, CA (US); Matthew Peddie, Santa Cruz, CA (US)

(73) Assignee: Joby Aviation, Inc., Santa Cruz, CA (US)

( * ) Notice: Subject to any disclaimer, the term of this patent is extended or adjusted under 35 U.S.C. 154(b) by 0 days.

(21) Appl. No.: 12/766,833

(22) Filed: Apr. 23, 2010

(65) Prior Publication Data

US 2011/0042509 A1    Feb. 24, 2011

Related U.S. Application Data

(60) Provisional application No. 61/312,188, filed on Mar. 9, 2010, provisional application No. 61/247,102, filed on Sep. 30, 2009, provisional application No. 61/236,520, filed on Aug. 24, 2009.

(51) Int. Cl.
*B64C 27/22* (2006.01)

(52) U.S. Cl.
USPC ............. 244/12.4; 244/7 R; 244/17.23

(58) Field of Classification Search
USPC .......... 244/17.23, 17.25, 17.27, 23 A, 56, 66, 244/7 R, 53 R, 12.4
See application file for complete search history.

(56) References Cited

U.S. PATENT DOCUMENTS

| 1,386,713 | A | * | 8/1921 | Leinweber et al. | 244/66 |
| 1,794,202 | A | * | 2/1931 | Pickard | 244/66 |
| D171,509 | S | * | 2/1954 | Lightbourn et al. | D12/325 |
| 2,868,476 | A | * | 1/1959 | Schlieben | 244/7 C |
| 3,002,712 | A | * | 10/1961 | Beckwith | 244/17.23 |
| 3,035,789 | A | * | 5/1962 | Young | 244/7 C |
| 3,081,964 | A | * | 3/1963 | Quenzler | 244/7 R |
| 3,082,977 | A | * | 3/1963 | Arlin | 244/17.23 |
| 3,181,810 | A | * | 5/1965 | Olson | 244/7 R |
| 3,231,221 | A | * | 1/1966 | Platt | 244/12.4 |
| 3,259,343 | A | * | 7/1966 | Roppel | 244/53 R |
| 3,350,035 | A | * | 10/1967 | Schlieben | 244/7 R |
| 3,360,217 | A | * | 12/1967 | Trotter | 244/12.4 |
| 3,834,654 | A | * | 9/1974 | Miranda | 244/13 |
| 4,022,405 | A | * | 5/1977 | Peterson | 244/12.3 |
| 4,053,125 | A | * | 10/1977 | Ratony | 244/46 |
| 4,146,199 | A | * | 3/1979 | Wenzel | 244/45 R |

(Continued)

FOREIGN PATENT DOCUMENTS

| WO | WO03074924 A1 | * | 9/2003 | F16L 37/44 |
| WO | WO03086857 A1 | * | 10/2003 | B64C 11/46 |

*Primary Examiner* — Benjamin P Lee
(74) *Attorney, Agent, or Firm* — Michael A. Guth

(57) ABSTRACT

An aerial vehicle adapted for vertical takeoff and landing using the same set of engines for takeoff and landing as well as for forward flight. An aerial vehicle which is adapted to takeoff with the wings in a vertical as opposed to horizontal flight attitude which takes off in this vertical attitude and then transitions to a horizontal flight path. An aerial vehicle which controls the attitude of the vehicle during takeoff and landing by alternating the thrust of engines, which are separated in at least two dimensions relative to the horizontal during takeoff, and which may also control regular flight in some aspects by the use of differential thrust of the engines.

8 Claims, 21 Drawing Sheets

(56) References Cited

U.S. PATENT DOCUMENTS

| | | | |
|---|---|---|---|
| 4,387,866 A * | 6/1983 | Eickmann | 244/7 C |
| 4,784,351 A * | 11/1988 | Eickmann | 244/7 C |
| 4,799,629 A * | 1/1989 | Mori | 244/23 C |
| 4,925,131 A * | 5/1990 | Eickmann | 244/7 C |
| 4,982,914 A * | 1/1991 | Eickmann | 244/56 |
| 5,082,079 A * | 1/1992 | Lissaman et al. | 180/118 |
| 5,419,514 A * | 5/1995 | Ducan | 244/12.4 |
| 5,823,468 A * | 10/1998 | Bothe | 244/2 |
| 5,839,691 A * | 11/1998 | Lariviere | 244/7 R |
| 5,842,667 A * | 12/1998 | Jones | 244/114 R |
| 6,098,923 A * | 8/2000 | Peters, Jr. | 244/45 R |
| 6,254,032 B1 * | 7/2001 | Bucher | 244/12.2 |
| 6,260,796 B1 * | 7/2001 | Klingensmith | 244/23 R |
| 6,286,783 B1 * | 9/2001 | Kuenkler | 244/30 |
| 6,402,088 B1 * | 6/2002 | Syrovy et al. | 244/10 |
| 6,474,604 B1 * | 11/2002 | Carlow | 244/198 |
| 6,568,630 B2 * | 5/2003 | Yoeli | 244/23 R |
| 6,708,920 B2 * | 3/2004 | Fukuyama | 244/12.4 |
| 6,745,977 B1 * | 6/2004 | Long et al. | 244/2 |
| 6,883,748 B2 * | 4/2005 | Yoeli | 244/12.3 |
| 6,886,776 B2 * | 5/2005 | Wagner et al. | 244/12.4 |
| 6,892,980 B2 * | 5/2005 | Kawai | 244/12.4 |
| 7,118,066 B2 * | 10/2006 | Allen | 244/7 B |
| 7,159,817 B2 * | 1/2007 | VanderMey et al. | 244/12.1 |
| 7,188,803 B2 * | 3/2007 | Ishiba | 244/23 R |
| 7,364,114 B2 * | 4/2008 | Wobben | 244/12.3 |
| 7,472,863 B2 * | 1/2009 | Pak | 244/12.5 |
| 7,857,253 B2 * | 12/2010 | Yoeli | 244/12.3 |
| 7,857,254 B2 * | 12/2010 | Parks | 244/12.4 |
| 7,874,513 B1 * | 1/2011 | Smith | 244/12.4 |
| 7,918,416 B2 * | 4/2011 | Yoeli | 244/23 A |
| 8,016,226 B1 * | 9/2011 | Wood | 244/23 A |
| 8,056,866 B2 * | 11/2011 | De Roche | 244/221 |
| 8,152,096 B2 * | 4/2012 | Smith | 244/60 |
| 2003/0038213 A1 * | 2/2003 | Yoeli | 244/50 |
| 2003/0062443 A1 * | 4/2003 | Wagner et al. | 244/12.3 |
| 2003/0080242 A1 * | 5/2003 | Kawai | 244/12.4 |
| 2003/0085319 A1 * | 5/2003 | Wagner et al. | 244/12.3 |
| 2003/0106959 A1 * | 6/2003 | Fukuyama | 244/23 R |
| 2005/0178879 A1 * | 8/2005 | Mao | 244/7 B |
| 2005/0230524 A1 * | 10/2005 | Ishiba | 244/23 A |
| 2006/0016930 A1 * | 1/2006 | Pak | 244/12.4 |
| 2006/0113426 A1 * | 6/2006 | Yoeli | 244/23 A |
| 2006/0226281 A1 * | 10/2006 | Walton | 244/17.23 |
| 2007/0221779 A1 * | 9/2007 | Ikeda | 244/7 A |
| 2008/0048065 A1 * | 2/2008 | Kuntz | 244/17.23 |
| 2008/0283673 A1 * | 11/2008 | Yoeli | 244/23 A |
| 2009/0008499 A1 * | 1/2009 | Shaw | 244/17.23 |
| 2009/0084907 A1 * | 4/2009 | Yoeli | 244/23 R |
| 2009/0140102 A1 * | 6/2009 | Yoeli | 244/23 D |
| 2009/0159757 A1 * | 6/2009 | Yoeli | 244/23 A |
| 2009/0224095 A1 * | 9/2009 | Cox et al. | 244/17.23 |
| 2009/0283629 A1 * | 11/2009 | Kroetsch et al. | 244/17.23 |
| 2010/0076625 A1 * | 3/2010 | Yoeli | 701/4 |
| 2010/0270419 A1 * | 10/2010 | Yoeli | 244/12.1 |
| 2011/0001020 A1 * | 1/2011 | Forgac | 244/7 A |
| 2011/0042510 A1 * | 2/2011 | Bevirt et al. | 244/12.4 |
| 2011/0049306 A1 * | 3/2011 | Yoeli | 244/23 A |
| 2011/0049307 A1 * | 3/2011 | Yoeli | 244/23 A |
| 2011/0139939 A1 * | 6/2011 | Martin et al. | 244/23 A |
| 2011/0147533 A1 * | 6/2011 | Goossen et al. | 244/23 A |
| 2011/0168834 A1 * | 7/2011 | Yoeli | 244/12.3 |

* cited by examiner

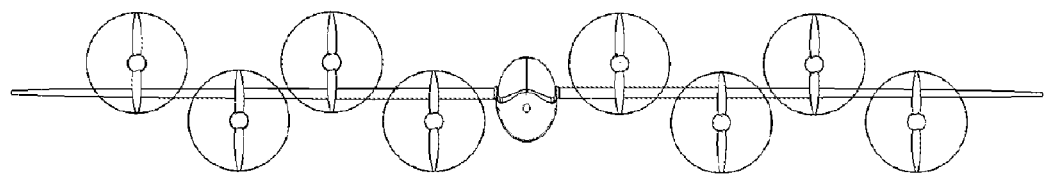
FIGURE 14B
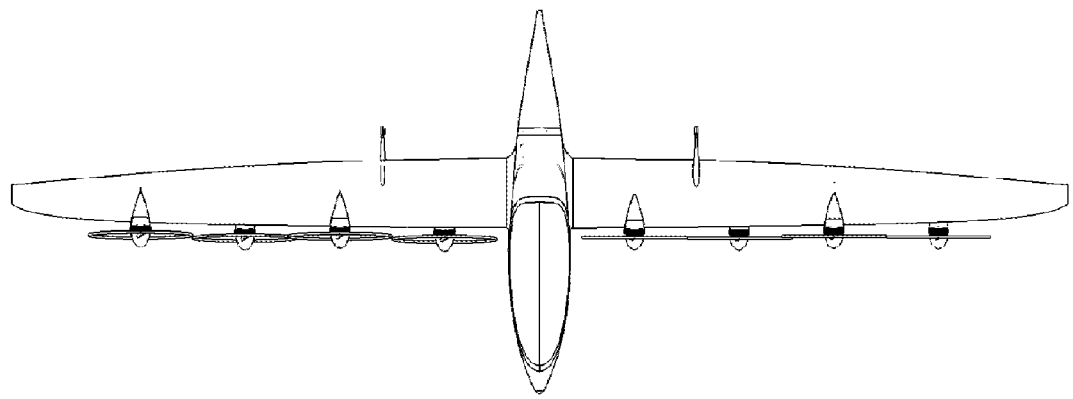
FIUGRE 14C

LIGHTWEIGHT VERTICAL TAKE-OFF AND LANDING AIRCRAFT AND FLIGHT CONTROL PARADIGM USING THRUST DIFFERENTIALS

CROSS-REFERENCE TO RELATED APPLICATIONS

This application claims priority to U.S. Provisional Patent Application No. 61/312,188 to Bevirt, filed Mar. 9, 2010, which is hereby incorporated by reference in its entirety. This application claims priority to U.S. Provisional Patent Application No. 61/247,102 to Bevirt, filed Sep. 30, 2009, which is hereby incorporated by reference in its entirety. This application claims priority to U.S. Provisional Patent Application No. 61/236,520 to Bevirt, filed Aug. 24, 2009, which is hereby incorporated by reference in its entirety.

BACKGROUND

1. Field of the Invention

This invention relates to powered flight, and more specifically to a take-off and flight control aircraft and flight method using thrust differentials.

2. Description of Related Art

There are generally three types of vertical takeoff and landing (VTOL) configurations: wing type configurations having a fuselage with rotatable wings and engines or fixed wings with vectored thrust engines for vertical and horizontal translational flight; helicopter type configuration having a fuselage with a rotor mounted above which provides lift and thrust; and ducted type configurations having a fuselage with a ducted rotor system which provides translational flight as well as vertical takeoff and landing capabilities.

SUMMARY

An aerial vehicle adapted for vertical takeoff and landing using the same set of thrust producing elements for takeoff and landing as well as for forward flight. An aerial vehicle which is adapted to takeoff with the wings in a vertical as opposed to horizontal flight attitude which takes off in this vertical attitude and then transitions to a horizontal flight path. An aerial vehicle which controls the attitude of the vehicle during takeoff and landing by alternating the thrust of motors, which are separated in at least two dimensions relative to the horizontal during takeoff, and which may also control regular flight in some aspects by the use of differential thrust of the motors.

BRIEF DESCRIPTION OF THE DRAWINGS

FIGS. 14A-D are views of an aerial vehicle in flight configuration according to some embodiments of the present invention.

DETAILED DESCRIPTION

Figure 1:
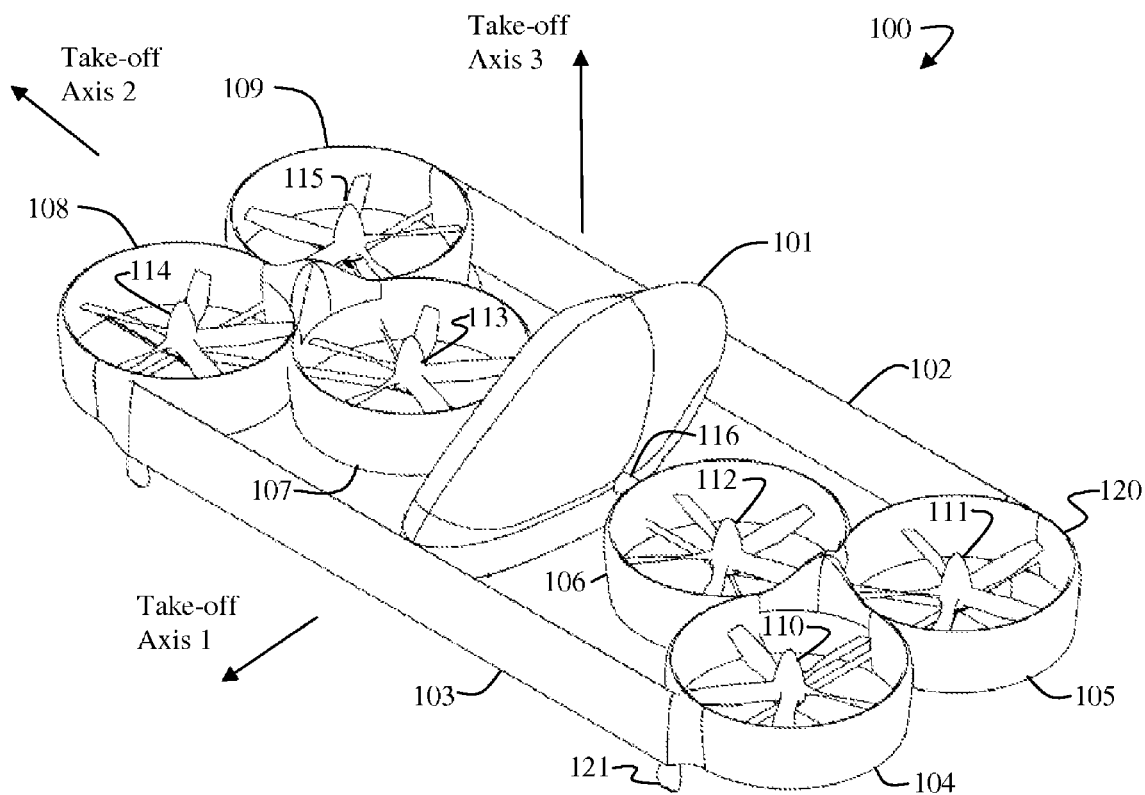
FIG. 1 is a perspective view of an aerial vehicle in takeoff configuration according to some embodiments of the present invention.

In some embodiments of the present invention, as seen in FIG. 1, an aerial vehicle 100 is seen in take-off configuration. The aircraft body 101 rotationally attached to the left inside duct 106 with a rotational coupling 116. The aircraft body 101 is also attached to the right inside duct 107 with a rotational coupling. The aircraft body 101 is adapted to rotate relative to the rotating portion 120.

In the take-off configuration, the aerial vehicle 100 is adapted to engage in controlled vertical take-off. The rotating portion 120 has landing struts 121 which are adapted to support the aircraft when on the ground. In some embodiments, the aerial vehicle 100 has six thrust producing elements, which may be ducted fans (propellers) driven by electric motors. A left inside duct 106, which is rotationally coupled to the aircraft body 101, is attached to an upper left outside duct 105 and a lower left outside duct 104. The left side ducts house fans 110, 111, 112 which may be driven by electric motors. A right inside duct 107, which is rotationally coupled to the aircraft body 101, is attached to an upper right outside duct 109 and a lower right outside duct 108. The right side ducts house fans 113, 114, 115 which may be driven by electric motors.

In a vertical takeoff scenario, the power from the fans 110, 111, 112, 113, 114, 115 are varied in power output in order to either change, or maintain, the attitude of the vehicle relative to take-off axis 1 or take-off axis 2. For example, to effect an attitude change around take-off axis 1, the relative power output of the left side motors can be varied relative to the power output of the right side motors. To effect an attitude change relative to take-off axis 2, the relative power output of the upper motors can be varied relative to the power output of the lower motors. In this way, the aerial vehicle can be raised from the ground in a vertical takeoff scenario while maintaining control in these two axes.

In some embodiments, the aerial vehicle may use a sensor package adapted to provide real time attitude information to a control system which is adapted to perform a vertical takeoff while maintaining the horizontal attitude position of the rotating portion 120 of the aerial vehicle 100. The control system may be autonomous in keeping the attitude while an operator commands an altitude raise while in takeoff mode. With the aerial vehicle adapted to take off from a position wherein the leading edges of the wings and the engines face skywards, no relative motion of the engines and the wings is necessary to achieve vertical take off and landing.

The spacing of the thrust producing elements in two dimensions as viewed from above when the aerial vehicle is on the ground ready for takeoff allows the engine power differentials to control the aircraft in the two aforementioned axes, take-off axis 1 and take-off axis 2. Although six thrust producing elements are illustrated here, the two dimensional spacing needed to affect two dimensional control could be achieved with as few as three engines.

Although the control of two axes has been discussed, in some embodiments rotation around take-off axis 3 may also be controlled. In some embodiments, the roll control during takeoff and landing may be controlled using ailerons. In some embodiments, directional vanes are placed behind the ducts, or within the ducts but behind the fans, in order to control take-off axis 3.

Figure 2:
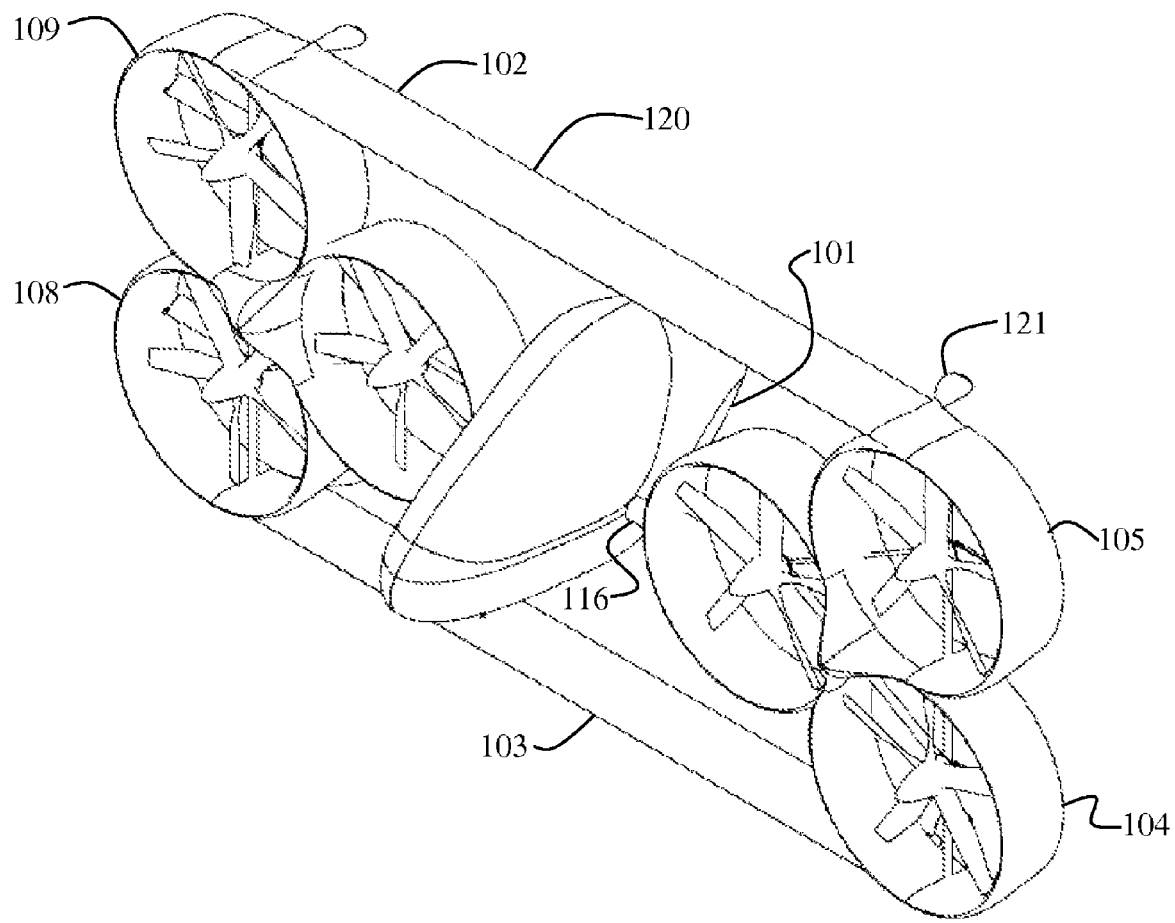
FIG. 2 is a perspective view of an aerial vehicle in a forward flight configuration according to some embodiments of the present invention.
Figure 3:
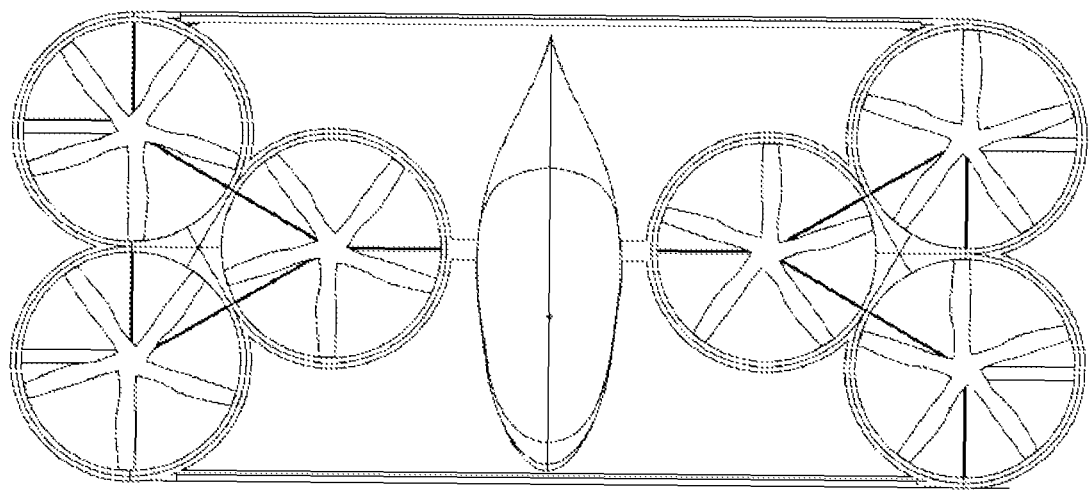
FIG. 3 is a top view of an aerial vehicle in takeoff configuration according to some embodiments of the present invention.
Figure 4:
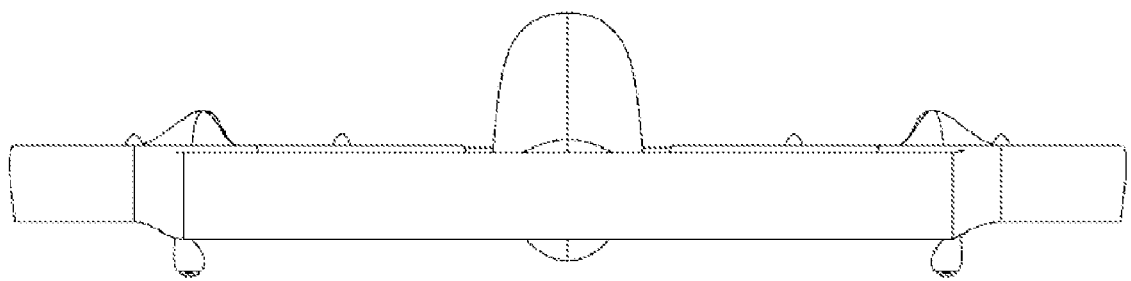
FIG. 4 is a front view of an aerial vehicle in takeoff configuration according to some embodiments of the present invention.
Figure 5:
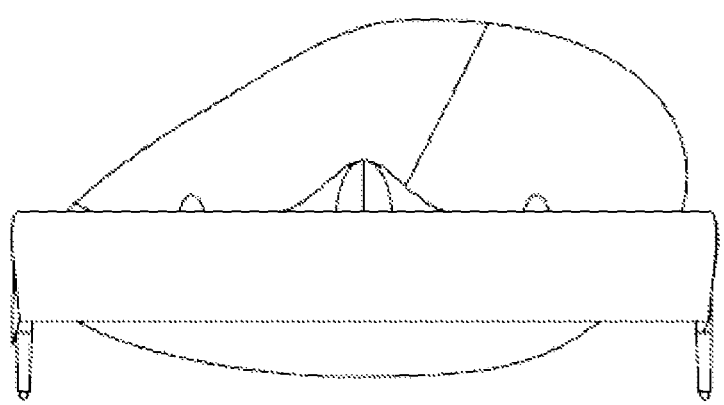
FIG. 5 is a side view of an aerial vehicle in takeoff configuration according to some embodiments of the present invention.
Figure 6:
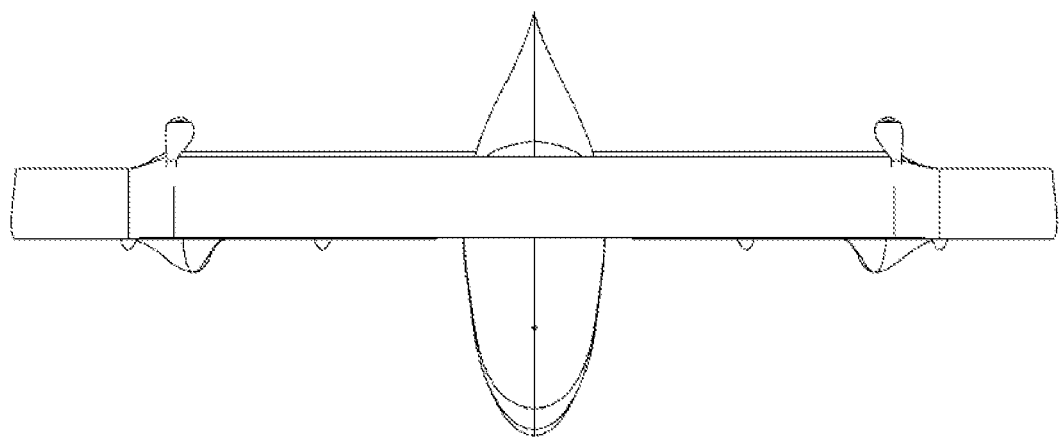
FIG. 6 is a top view of an aerial vehicle in forward flight configuration according to some embodiments of the present invention.
Figure 7:
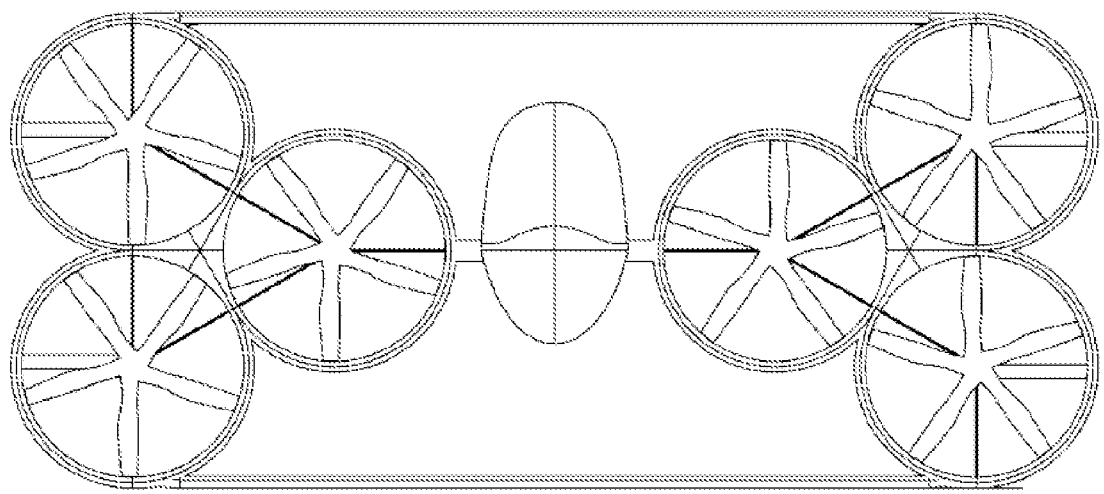
FIG. 7 is a front view of an aerial vehicle in forward flight configuration according to some embodiments of the present invention.
Figure 8:
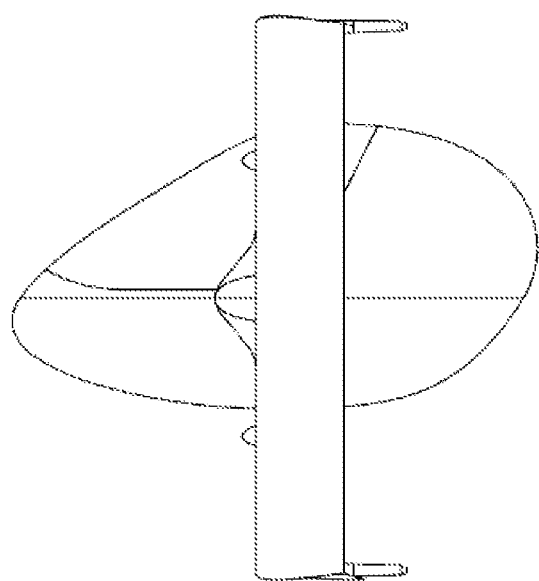
FIG. 8 is a side view of an aerial vehicle in forward flight configuration according to some embodiments of the present invention.

As seen in FIG. 2, the aerial vehicle 100 has a forward flight configuration wherein the rotating portion 120 is rotated approximately 90 degrees relative to the aircraft body 101 compared to the take-off configuration. An upper wing 102 is attached to the top of the right upper duct 109 and the left upper duct 105. A lower wing 103 is attached to the bottom of the right lower duct 108 and the left lower duct 104. The upper wing 102 and the lower wing 103 are lifting airfoils which are adapted to provide sufficient lift to support the mass of the aerial vehicle 100 during forward flight.

As seen, the aircraft body may be sized such the rotating portion, including the wings and the ducted fan assemblies, is adapted to rotate from a first take-off position to a second forward flight position without physical interference with the aircraft body in which the pilot may sit. Also seen is that in some embodiments the wings are not attached to the aircraft body, but are attached to the rotating group of fan assemblies.

Figure 9:
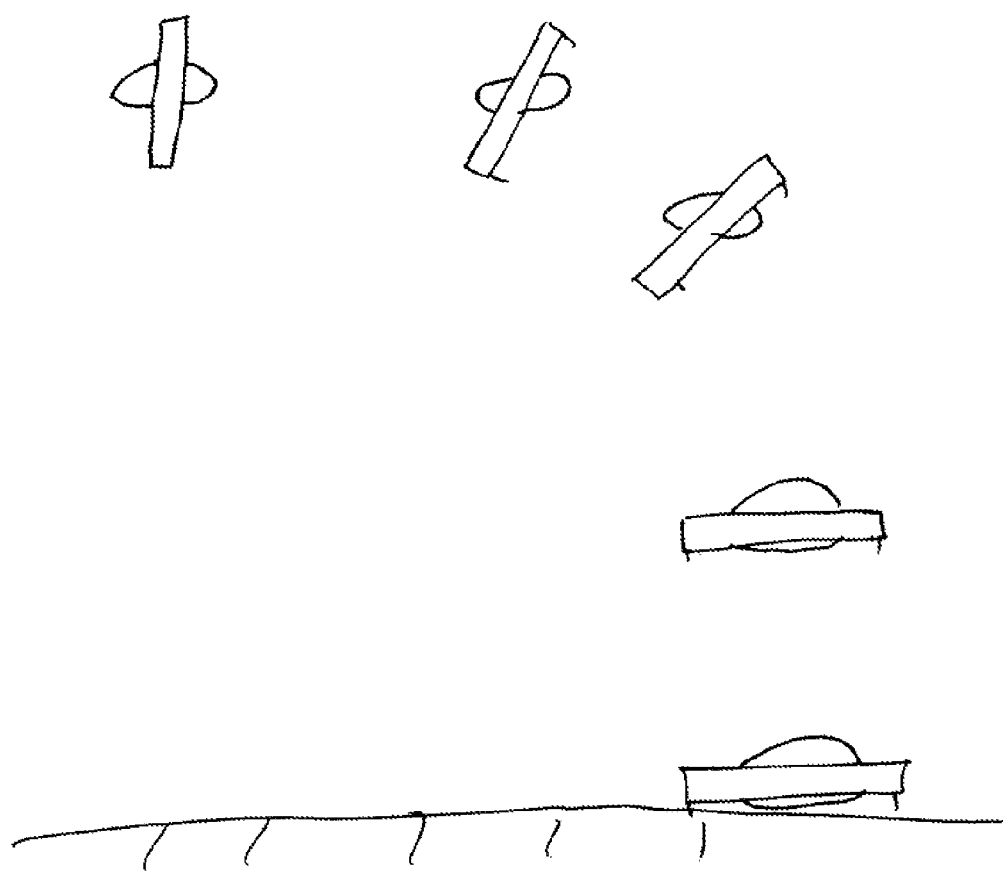
FIG. 9 is a sketch of the transition from take-off to forward flight mode.

FIG. 9 illustrates the transition from vertical takeoff to horizontal flight according to some embodiments of the present invention. As seen, the aerial vehicle first engages in vertical takeoff while maintaining attitude control using an onboard sensor package and by varying the power output of the motors to maintain attitude in a desired range, and may also use ailerons or vanes behind the fans for control in take-off axis 3. As the aerial vehicle is raised to a desired altitude, the transition to horizontal flight begins. With the use of differential power output control of the motors, the rotating portion, which includes the wings and the motors/fans/ducts, is pitched forward, which alters the wings from their skyward facing position to a more horizontal, normal flying position. This forward pitching of the rotating portion, which then begins to direct thrust rearward, also causes the vehicle to begin to accelerate forward horizontally. With the increase in horizontal velocity coupled with the wing airfoils attitude change to a more horizontal position, lift is generated from the wing airfoils. Thus, as the rotating portion is transitioned to a more horizontal position and their vertical thrust is reduced, lift is begun to be generated from the wing airfoils and the altitude of the aerial vehicle is maintained using the lift of the wings. In this fashion, the aerial vehicle is able to achieve vertical takeoff and transition to horizontal flight without relative motion of the motors to the wings, and using differential control of the power of the motors to achieve some, if not all, of the attitude changes for this maneuver. When landing the craft, these steps as described above are reversed.

Although not illustrated, in some embodiments the aerial vehicle 100 may have control surfaces such as rudders, elevators, and/or other control surfaces, which may be mounted to the aircraft body. In some embodiments, the aerial vehicle 100 may have ailerons on one or more of its wings which are adapted for roll control.

The vehicle may be adapted to turn using a simultaneous roll and pitch up, which is affected by the ailerons with regard to roll, and by differentially throttling the motors with regard to pitch. Namely, upper motors may be throttled down relative to the lower motors to achieve an upward change in pitch used in conjunction with the roll of the vehicle to turn the vehicle.

The control system adapted for attitude control during takeoff using differential control of the thrust elements, which may be electric motors with ducted fans in some embodiments, is also adapted to be used during traditional, more horizontal flight. Although the aerial vehicle may have rudders and elevators in some embodiments, the aerial vehicle and its control system are adapted to use differential control of the thrust elements to vary pitch and yaw during forward flight, and in some embodiments, to control roll as well.

When the pilot gives a pitch command during horizontal flight, the onboard control system then executes a pitch change using a combination of engine thrust differentiation, and also through the use of the ailerons on both sides of the wing in common mode. The pitch change will be executed primarily or fully by differential throttling of the upper and lower motors. A pitch command may be given by the pilot by pulling or pushing a control stick, or by pulling back or pushing on a steering yoke, for example.

When the pilot gives a roll command during horizontal flight, the onboard control system then executes a roll of the aerial vehicle using a combination of aileron control and differential thrusting of counter-rotating motors on the aerial vehicle.

When the pilot gives a yaw command during horizontal flight, the onboard control system then executes a yaw change of the aerial vehicle using engine thrust differentiation. The yaw change will be executed by differential throttling of the right side and left side motors.

An aerial vehicle 100 according to some embodiments of the present invention thus allows for attitude control of the vehicle during VTOL and regular flight using the same or similar control system parameters, including thrust differentiation of the various thrust producing elements. In some embodiments, the thrust control may involve the reduction or increase of electrical power sent to the motors controlling a propeller or ducted fan assembly, with a corresponding change in the relative rotational velocities of the motors. In some embodiments, the thrust control may involve the change of pitch of the propeller/fan blades. In some embodiments, thrust control may use a combination of pitch control and electrical power input control.

In some embodiments of the present invention, the aerial vehicle may be designed for use as a commuter vehicle. In such a scenario, safety, reliability, compactness, and noise become important design considerations.

In some embodiments, reliability may be enhanced by the use of two motors on a single shaft driving each of the ducted fan assemblies. The use of two sets of windings wherein one set of windings is used for driving the ducted fan, and the second is a redundant set of windings which may be used in the case of a winding failure, greatly enhances reliability.

In some embodiments, the electric motors of the aerial vehicle are powered by rechargeable batteries. The use of multiple batteries driving one or more power busses enhances reliability, in the case of a single battery failure. In some embodiments, the batteries may be spread out along the rotating portion, and there may be one battery for each of the motor/ducted fan assemblies. In some embodiments, the battery or batteries may reside in part or fully within the aircraft body, with power routed out to the motors through the rotational couplings.

In some embodiments, the aerial vehicle is adapted to be able to absorb the failure of one ducted fan assembly and still have sufficient power to engage in both forward flight and also vertical take-off and landing. Given the spacings of the motors, the loss of thrust by one of the thrust producing elements will still allow for attitude control of the vehicle using thrust differentials. The control system of the vehicle may be adapted to sense the failure of one or more thrust producing elements and modify the control paradigms accordingly.

In some embodiments, the vehicle may have multiple sensor packages adapted to provide attitude, altitude, position, and other information. The sensor packages may be duplicates of each other, allowing for failure of a sensor package in a redundant fashion. In other embodiments, there may be a variety of different types of sensors which are integrated using a common filter, and which also may be able to absorb the loss of one or more of the single sensor types without loss, or without complete loss, of functionality of the vehicle.

Although ducted fans assemblies are illustrated in the embodiments shown herein, it is understood that other types of thrust producing elements may be used. In some embodiments, ducted fan assemblies may be chosen to enhance safety and to reduce noise of the vehicle.

In some embodiments, the aerial vehicle may have an emergency safety system such as a ballistic parachute. In the case of absolute failure of the power or control systems, the ballistic parachute may be deployed to allow for an emergency landing.

In an exemplary embodiment, a vehicle 100 is made primarily from composite materials. The total weight, including the pilot, may be 600 pounds. The weight may be allocated as 200 pounds for the batteries, 150-200 pounds for the pilot, and 200-250 pounds for the remaining aircraft structure less the battery weight. With a six ducted fan/six motor system, the nominal engine load would be 100 pounds per duct. The six ducts may be identical in size, each with an interior diameter of 42 inches. With a 10 horsepower engine per duct, the disc loading is 10 pounds per foot squared. The specific thrust (pounds of thrust/horsepower) is targeted for a range of 8-12.5.

In this exemplary embodiment, the length of the upper and lower wings is 14 feet, with a chord length of 18 inches. The system may have a stall speed of 70 miles per hour. The system is designed to have a ground parking envelope maximum of 8 feet by 18 feet, which is geared in part to allow it to fit in a parking space.

The range of the vehicle may be 100 miles, with a flight speed of 100 miles per hour. The range may be achieved using a 15 kWhr battery.

Figure 10:
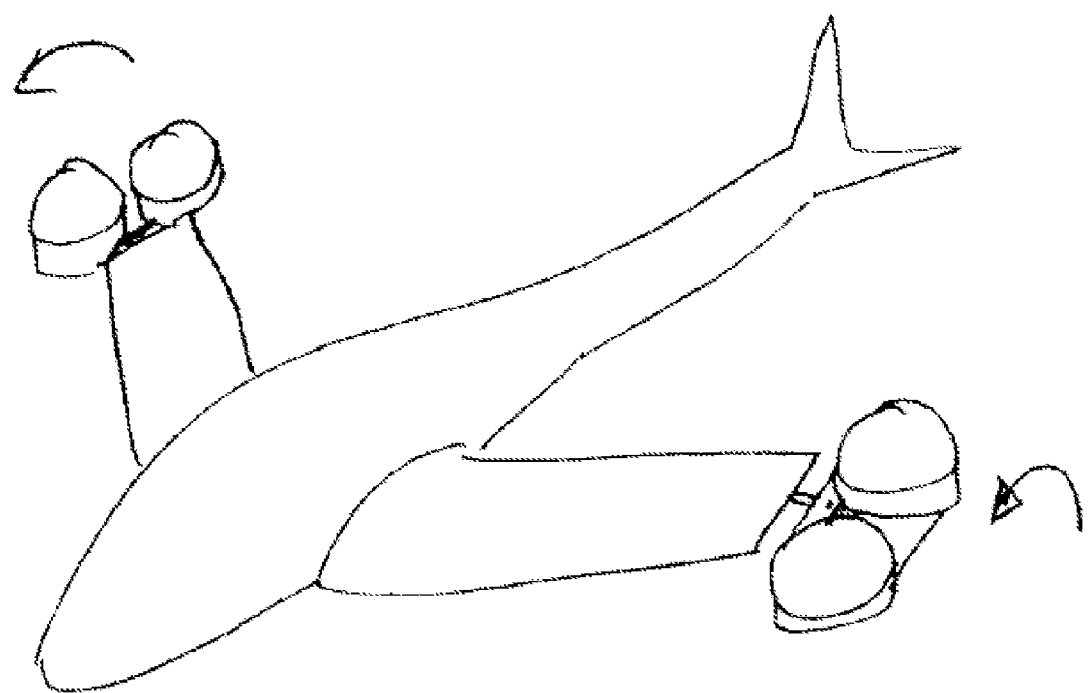
FIG. 10 is sketch of an aerial vehicle according to some embodiments of the present invention.

In some embodiments of the present invention, as seen in FIG. 10, an aerial vehicle may have two sets of thrust producing elements, one on each side of the aircraft body. The thrust producing elements may be ducted fans driven by electric motors. The thrust assemblies are adapted to rotate from a first position wherein the thrust is primarily downward to a second position adapted for forward flight, with the thrust primarily rearward. With the spacing of the thrust elements as seen, attitude control can be achieved using thrust differentiation both during vertical take-off (the position shown in the figure) as well as during forward flight, as the thrust elements are spaced in two dimensions relative to the direction of motion in both take-off and forward flight modes.

Figure 11:
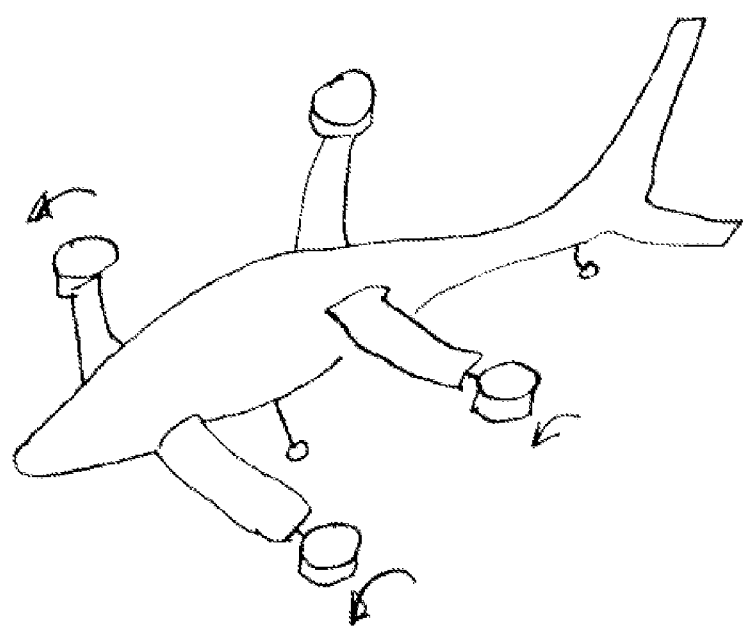
FIG. 11 is a sketch of an aerial vehicle according to some embodiments of the present invention.
Figure 12:
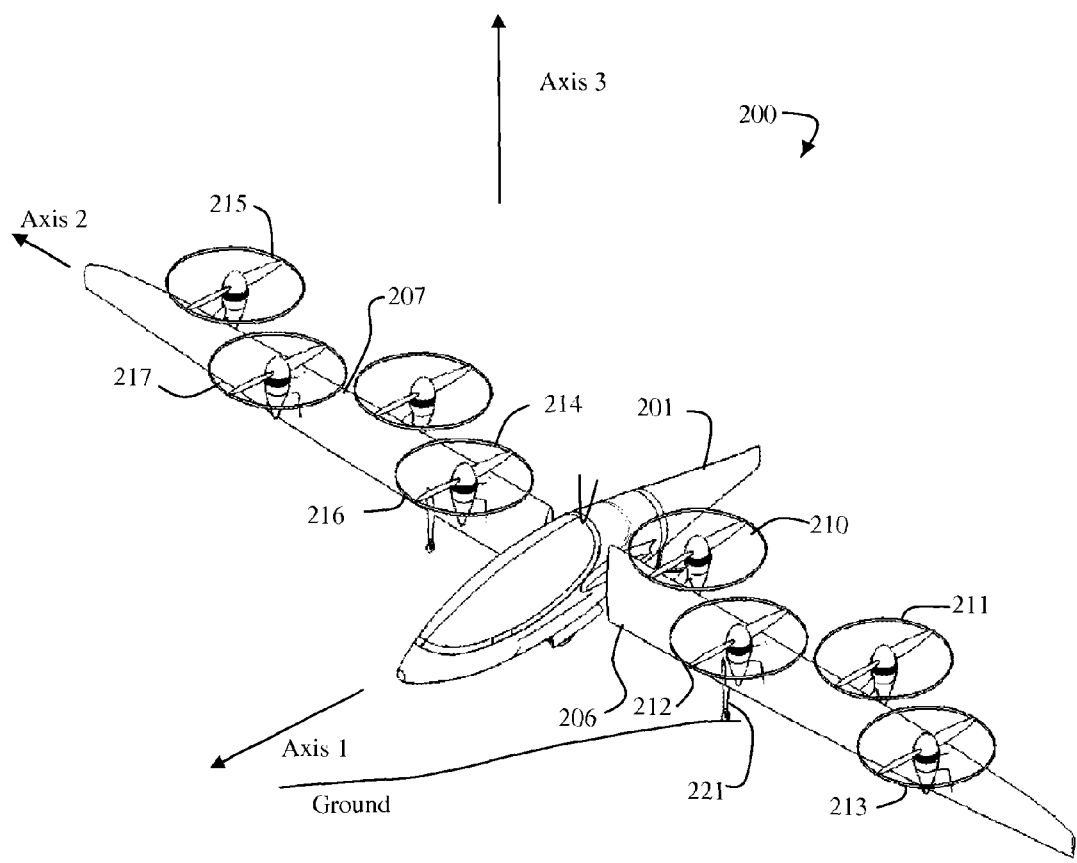
FIG. 12 is a perspective view of an aerial vehicle in take-off configuration according to some embodiments of the present invention.
Figure 13A:
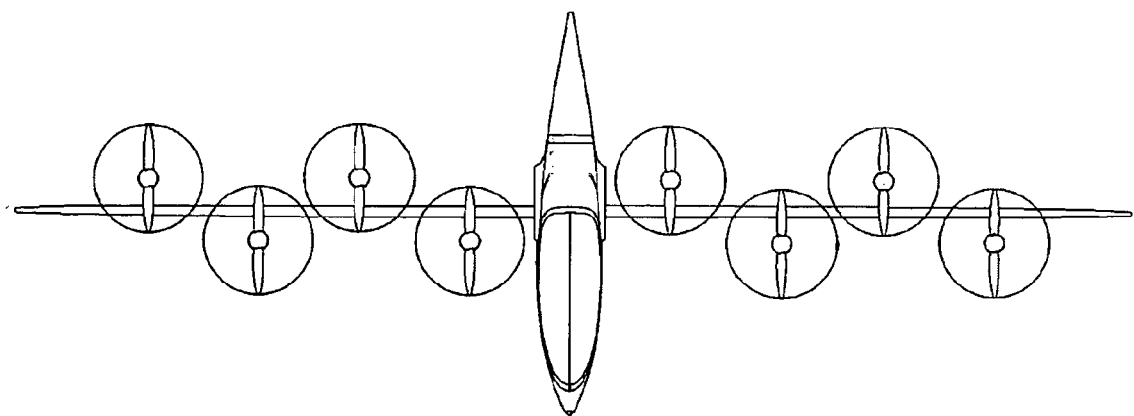
FIGS. 13A-C are orthogonal views of an aerial vehicle in take-off configuration according to some embodiments of the present invention.
Figure 13B:
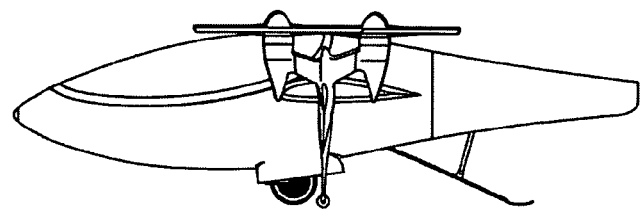
Figure 13C:
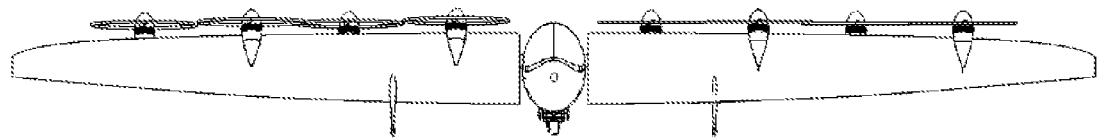
Figure 14A:
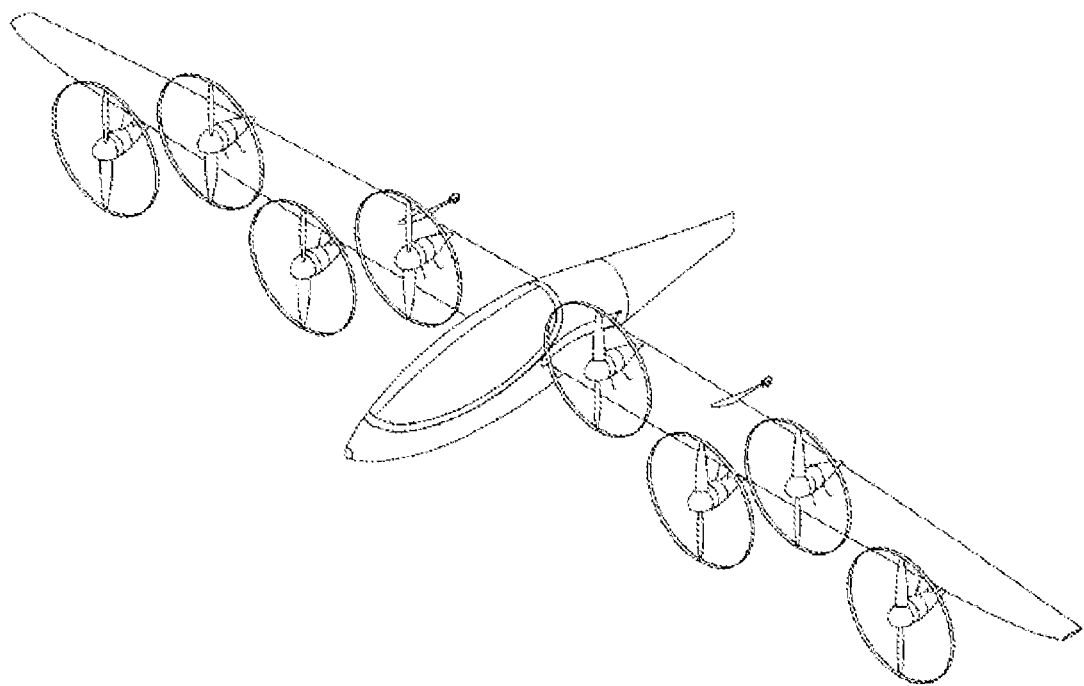
Figure 14D:
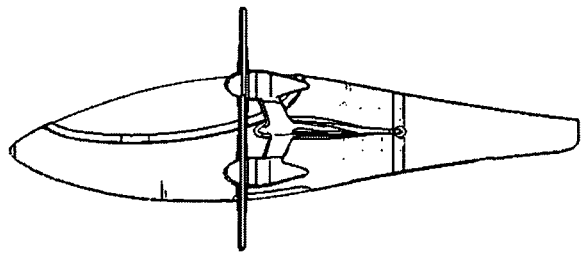

In some embodiments of the present invention, as seen in FIG. 11, an aerial vehicle may have four thrust producing elements spread out over two wings. The wings may be set at different heights, thus the thrust elements are spaced in two dimensions in forward flight mode as well as during vertical take-off mode (pictured). The thrust producing elements may be ducted fans driven by electric motors. The thrust assemblies are adapted to rotate from a first position wherein the thrust is primarily downward to a second position adapted for forward flight, with the thrust primarily rearward. With the spacing of the thrust elements as seen, attitude control can be achieved using thrust differentiation both during vertical take-off (the position shown in the figure) as well as during forward flight, as the thrust elements are spaced in two dimensions relative to the direction of motion in both take-off and forward flight modes.

In some embodiments of the present invention, as seen in FIGS. 12 and 13A-C, an aerial vehicle 200 is seen in take-off configuration. The aircraft body 201 rotationally attached to the left inside wing section 206 with a rotational coupling 216. The aircraft body 201 is also attached to the right inside wing section 207 with a rotational coupling. The aircraft body 201 is adapted to rotate relative to the rotating wing sections 206, 207.

In the take-off configuration, the aerial vehicle 200 is adapted to engage in controlled vertical take-off. The inside wing sections 206, 207 have landing struts 221 which are adapted to support the aircraft when on the ground. The aircraft body 201 may also have a front support 281. In some embodiments, the aerial vehicle 200 has eight thrust producing elements, which may be ducted fans (propellers) driven by electric motors, or propellers driven by electric motors.

In a vertical takeoff scenario, the power from the fans 210, 211, 212, 213, 214, 215. 216, 217 are varied in power output in order to either change, or maintain, the attitude of the vehicle relative to take-off axis 1 or take-off axis 2. For example, to effect an attitude change around take-off axis 1, the relative power output of the left side motors can be varied relative to the power output of the right side motors. To effect an attitude change relative to take-off axis 2, the relative power output of the upper motors can be varied relative to the power output of the lower motors. In this way, the aerial vehicle can be raised from the ground in a vertical takeoff scenario while maintaining control in these two axes.

In some embodiments, the relative power output of the motors is varied by varying the relative speed of the motors. For example, if the blade pitch is held constant and the speed of the motor is reduced, the thrust of that unit is reduced. If the speed of the motor is increased, the thrust of that unit is increased. In some embodiments, each motor utilizes an independent motor controller which is adapted to vary the speed of a motor.

In some embodiments, the aerial vehicle may use a sensor package adapted to provide real time attitude information to a control system which is adapted to perform a vertical takeoff while maintaining the horizontal attitude position of the engines, and the vertical thrust direction, of the aerial vehicle 200. The control system may be autonomous in keeping the attitude while an operator commands an altitude raise while in takeoff mode. With the aerial vehicle adapted to take off from a position wherein the leading edges of the wings and the engines face skywards, no relative motion of the engines and the wings is necessary to achieve vertical take off and landing.

The spacing of the thrust producing elements in two dimensions as viewed from above when the aerial vehicle is on the ground ready for takeoff allows the engine power differentials to control the aircraft in the two aforementioned axes, take-off axis 1 and take-off axis 2. Although eight thrust producing elements are illustrated here, the two dimensional spacing needed to affect two dimensional control could be achieved with as few as three engines.

Although the control of two axes has been discussed, in some embodiments rotation around take-off axis 3 may also be controlled. In some embodiments, the rotation around take-off axis 3 may be controlled by differential rotation of the wings. For example, one wing may pivot to a position slightly past vertical, and the other wing may pivot to a position a bit less than vertical, thus inducing rotation about take-off axis 3. With the inclusion of this counter pivoting mode, all axes are controlled during take-off. The control of take-off axis 3 using offset pivoting of the wings may be affected without alteration of motor speed in some embodiments.

In some embodiments, the roll control during takeoff and landing may be controlled using ailerons. In some embodiments, directional vanes are placed behind the ducts, or within the ducts but behind the fans, in order to control take-off axis 3. In some embodiments, the fans/propellers may be counter-rotating, and the rotation around take-off axis 3 may be controlled by differentiating the speed of the counter-rotating fans/propellers.

As seen in FIGS. 14A-D, the aerial vehicle 200 has a forward flight configuration wherein the wings are rotated approximately 90 degrees relative to the aircraft body 201 compared to the take-off configuration. As seen, the aircraft body may be sized such that the wings and the ducted fan assemblies, are adapted to rotate from a first take-off position to a second forward flight position while maintaining proper balance with the aircraft body in which the pilot may sit.

The aerial vehicle first engages in vertical takeoff while maintaining attitude control using an onboard sensor package and by varying the power output of the motors to maintain attitude in a desired range, and may also use differential wing pivoting, ailerons, or vanes behind the fans for control in take-off axis 3. As the aerial vehicle is raised to a desired altitude, the transition to horizontal flight begins. With the use of differential power output control of the motors, the wings are pitched forward, which alters the wings from their skyward facing position to a more horizontal, normal flying position. This forward pitching of the wings, which then begins to direct thrust rearward, also causes the vehicle to begin to accelerate forward horizontally. With the increase in horizontal velocity coupled with the wing airfoils attitude change to a more horizontal position, lift is generated from the wing airfoils. Thus, as the rotating portion is transitioned to a more horizontal position and their vertical thrust is reduced, lift is begun to be generated from the wing airfoils and the altitude of the aerial vehicle is maintained using the lift of the wings. In this fashion, the aerial vehicle is able to achieve vertical takeoff and transition to horizontal flight without relative motion of the motors to the wings, and using differential control of the power of the motors to achieve some, if not all, of the attitude changes for this maneuver. When landing the craft, these steps as described above are reversed.

Although not illustrated, in some embodiments the aerial vehicle 200 may have control surfaces such as rudders, elevators, and/or other control surfaces, which may be mounted to the aircraft body. In some embodiments, the aerial vehicle 100 may have ailerons on one or more of its wings which are adapted for roll control.

The vehicle may be adapted to turn using a simultaneous roll and pitch up, which is affected by the ailerons with regard to roll, and by differentially throttling the motors with regard to pitch. Namely, upper motors may be throttled down relative to the lower motors to achieve an upward change in pitch used in conjunction with the roll of the vehicle to turn the vehicle.

The control system adapted for attitude control during takeoff using differential control of the thrust elements, which may be electric motors with ducted fans in some embodiments, is also adapted to be used during traditional, more horizontal flight. Although the aerial vehicle may have rudders and elevators in some embodiments, the aerial vehicle and its control system are adapted to use differential control of the thrust elements to vary pitch and yaw during forward flight, and in some embodiments, to control roll as well.

When the pilot gives a pitch command during horizontal flight, the onboard control system then executes a pitch change using a combination of engine thrust differentiation, and also through the use of the ailerons on both sides of the wing in common mode. The pitch change will be executed primarily or fully by differential throttling of the upper and lower motors. A pitch command may be given by the pilot by pulling or pushing a control stick, or by pulling back or pushing on a steering yoke, for example.

When the pilot gives a roll command during horizontal flight, the onboard control system then executes a roll of the aerial vehicle by differentially rotating the wings, or by using a combination of aileron control and differential thrusting of counter-rotating motors on the aerial vehicle.

When the pilot gives a yaw command during horizontal flight, the onboard control system then executes a yaw change of the aerial vehicle using engine thrust differentiation. The yaw change will be executed by differential throttling of the right side and left side motors.

An aerial vehicle 200 according to some embodiments of the present invention thus allows for attitude control of the vehicle during VTOL and regular flight using the same or similar control system parameters, including thrust differentiation of the various thrust producing elements. In some embodiments, the thrust control may involve the reduction or increase of electrical power sent to the motors controlling a propeller or ducted fan assembly. The change in electrical power sent to the motors may result in a change in rotational velocity of the motors. In some embodiments, the thrust control may involve the change of pitch of the propeller/fan blades. In some embodiments, thrust control may use a combination of pitch control and electrical power input control.

Figure 15:
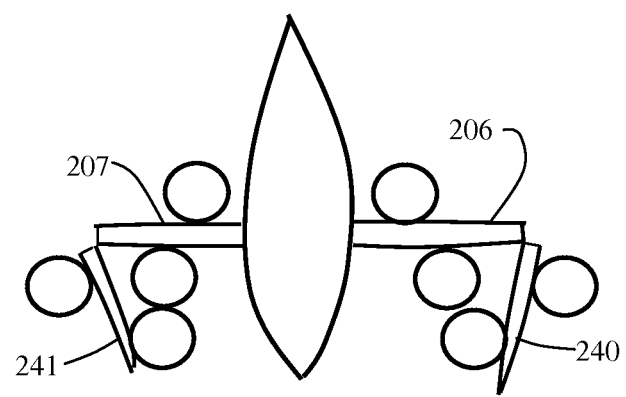
FIG. 15 is a view of an aerial vehicle with its wings folded according to some embodiments of the present invention.

In some embodiments of the present invention, as seen in FIG. 15, the wings are adapted to fold in order to reduce the area occupied by the aerial vehicle on the ground. While on the ground, and with the wings in the take-off position (wind leading edges skyward), the outer wing sections 240, 241 are adapted to pivot relative to the inside wing sections 206, 207. The outer wing sections 240, 241 do not directly support the weight of the wings or the vehicle relative to the ground underneath. Thus, the outer wings sections may be rotated forward in order to allow the landed vehicle to fit into a much smaller area.

In an exemplary embodiment of the aerial vehicle 200, the vehicle is made primarily from composite materials. The total weight, including the pilot, may be 300 kg, including 120 kg of batteries. With an eight prop/motor system, the nominal engine load would be 37.5 kg of thrust per propeller. The eight propellers may be identical in size, each with a diameter of 1.1 meters. The take-off power would be approximately 8 kW/rotor.

In this exemplary embodiment, the wingspan is 10 meters. The system may have a cruising speed of 45 meters/second. The system is designed to fit in a parking space.

In some embodiments of the present invention, the aerial vehicle may be designed for use as a commuter vehicle. In such a scenario, safety, reliability, compactness, and noise become important design considerations.

In some embodiments, reliability may be enhanced by the use of two motors on a single shaft driving each of the ducted fan assemblies. The use of two sets of windings wherein one set of windings is used for driving the ducted fan, and the second is a redundant set of windings which may be used in the case of a winding failure, greatly enhances reliability.

In some embodiments, the electric motors of the aerial vehicle are powered by rechargeable batteries. The use of multiple batteries driving one or more power busses enhances reliability, in the case of a single battery failure. In some embodiments, the batteries may be spread out along the rotating portion, and there may be one battery for each of the motor/ducted fan assemblies. In some embodiments, the battery or batteries may reside in part or fully within the aircraft body, with power routed out to the motors through the rotational couplings. In some embodiments, the batteries reside within the vehicle body on an rack with adjustable position such that the vehicle balance may be adjusted depending upon the weight of the pilot.

In some embodiments, the aerial vehicle 200 is adapted to be able to absorb the failure of one ducted fan assembly (or motor/propeller) and still have sufficient power to engage in both forward flight and also vertical take-off and landing. Given the spacings of the motors, the loss of thrust by one of the thrust producing elements will still allow for attitude control of the vehicle using thrust differentials. The control system of the vehicle may be adapted to sense the failure of one or more thrust producing elements and modify the control paradigms accordingly.

In some embodiments, the vehicle 200 may have multiple sensor packages adapted to provide attitude, altitude, position, and other information. The sensor packages may be duplicates of each other, allowing for failure of a sensor package in a redundant fashion. In other embodiments, there may be a variety of different types of sensors which are integrated using a common filter, and which also may be able to absorb the loss of one or more of the single sensor types without loss, or without complete loss, of functionality of the vehicle.

Although ducted fans assemblies are illustrated in the embodiments shown herein, it is understood that other types of thrust producing elements may be used. In some embodiments, ducted fan assemblies may be chosen to enhance safety and to reduce noise of the vehicle.

In some embodiments, the aerial vehicle 200 may have an emergency safety system such as a ballistic parachute. In the case of absolute failure of the power or control systems, the ballistic parachute may be deployed to allow for an emergency landing.

Figure 16:
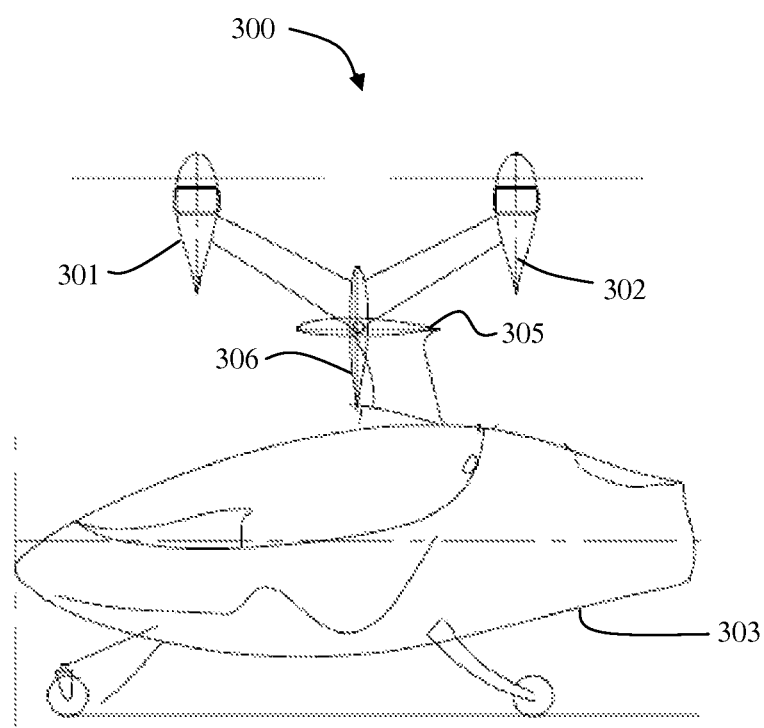
FIG. 16 is side view of an aerial vehicle in the take-off position according to some embodiments of the present invention.
Figure 17:
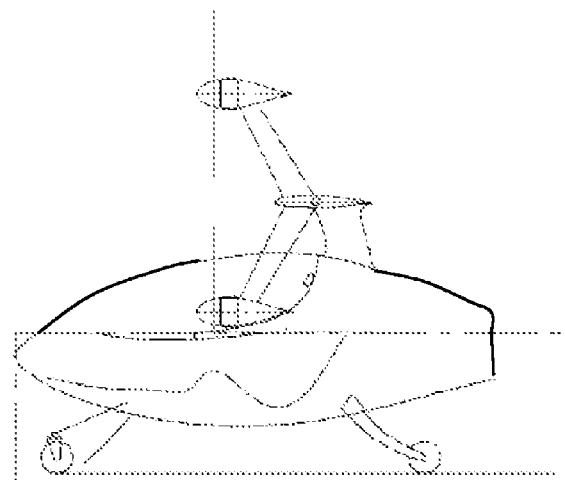
FIG. 17 is a side view of an aerial vehicle in a horizontal flight position according to some embodiments of the present invention.
Figure 18:
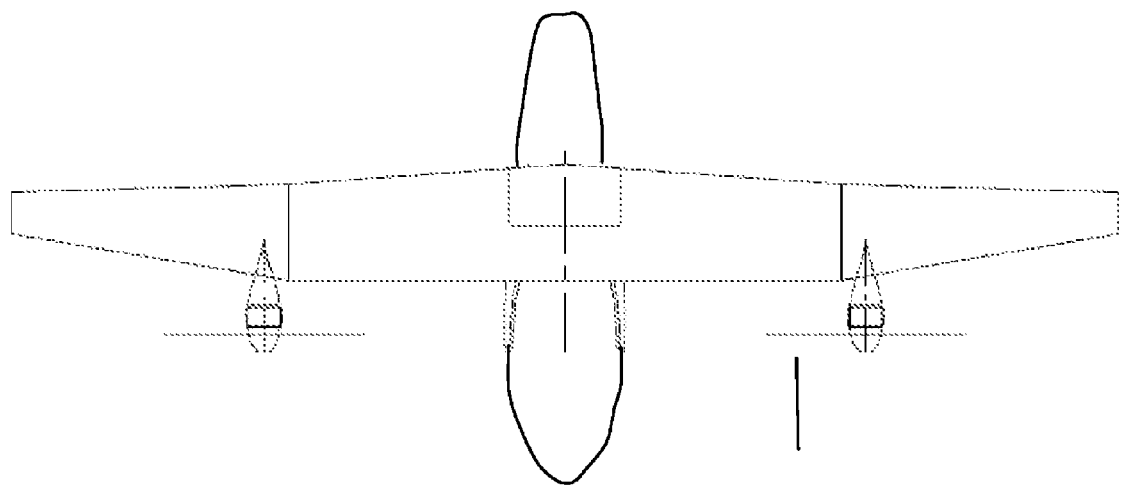
FIG. 18 is a top view of an aerial vehicle in a horizontal flight position according to some embodiments of the present invention.

In some embodiments of the present invention, as seen in FIGS. 16, 17, and 18, an aerial vehicle 300 has rotors 302, 301 both above and below the wings. In this embodiment, both the left wing and the right wing have a rotor above and below the wing. The vehicle 300 has a main body 303 to which the wings are attached. The over/under rotor pairs are adapted to rotate with their outer wing portion 306 relative to the main body 303. In some embodiments, the wing may have two portions, an inner portion 305 affixed to the main body 303, and an outer portion 305 adapted to rotate relative to the body/inner wing portion.

FIG. 16 illustrates the aerial vehicle 300 in a take-off position. With the outer wing portions rotated such that the thrust is downward, the aerial vehicle is capable of vertical take-off and landing. With rotors separated in two axis in the plane of the ground, stability may be achieved at least in these two axis using thrust differentials as described herein. The outer wings are adapted to rotate relative to the main body, and may rotate in unison or using offset control.

FIG. 17 illustrates the aerial vehicle 300 in a forward flight position. With the outer wing portions rotated such that the inner and outer wings are in plane and adapted for normal flight, the over/under rotor pairs are spaced in two dimensions relative to the flight direction. As with other embodiments described herein, there is two dimensional spacing of the thrust elements in both the take-off mode and in the forward flight mode. An advantage of such a system, as previously described, is that attitude control may be achieved solely by variation of the speed of the rotors. Although the blades of the rotors may be controllable in some embodiments, and other controllable surfaces may be present, no such control is needed with the vehicles described herein.

Figure 19:
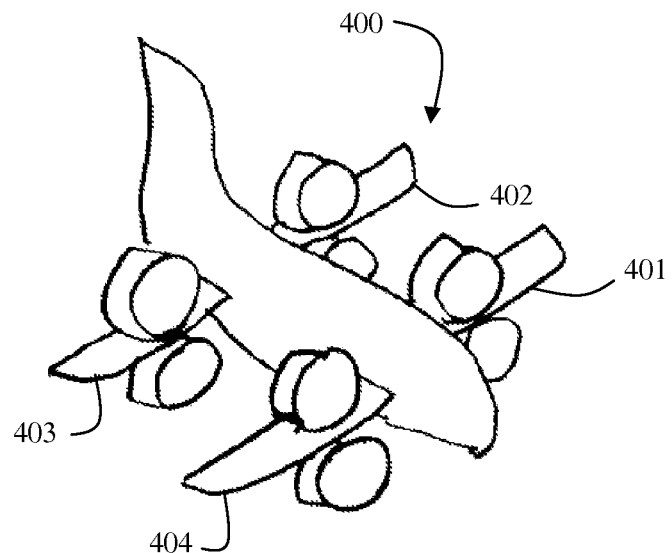
FIG. 19 is a perspective view of a two winged aerial vehicle in a horizontal flight position according to some embodiments of the present invention.
Figure 20:
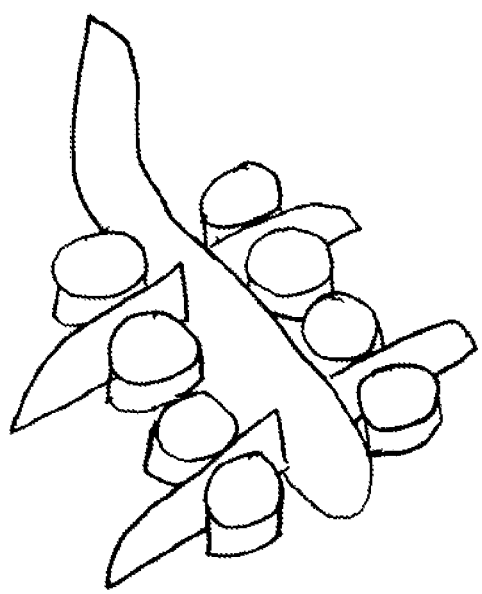
FIG. 20 is a perspective view of a two winged aerial vehicle in a take-off position according to some embodiments of the present invention.

In some embodiments of the present invention, as seen in FIGS. 19 and 20, an aerial vehicle 400 may have forward wings 401, 404 and rear wings 402, 403. FIG. 19 illustrates the aerial vehicle 400 in a forward flight position. FIG. 20 illustrates the aerial vehicle 400 in a vertical take-off orientation. The wings are adapted to pivot relative to the body of the aerial vehicle such that the rotors are used both for forward flight and vertical take-off. In some embodiments, the wings are at the same elevation during horizontal flight. In some embodiments, the wings are at staggered elevations during horizontal flight.

With the use of two wing sets, each with a rotating left and a rotating wing portion, and with each of these wing portions having an upper and a lower rotor, a higher level of redundancy enters the system that allows for possible failures while still maintaining the ability to control attitude during take-off and forward flight.

As evident from the above description, a wide variety of embodiments may be configured from the description given herein and additional advantages and modifications will readily occur to those skilled in the art. The invention in its broader aspects is, therefore, not limited to the specific details and illustrative examples shown and described. Accordingly, departures from such details may be made without departing from the spirit or scope of the applicant's general invention.

What is claimed is:

1. An aerial vehicle adapted for vertical takeoff and horizontal flight, said aerial vehicle comprising:
   a main vehicle body;
   one or more electric batteries;

a two dimensional array of three or more rotors pivotally connected to said main vehicle body, wherein each of said rotors comprise an electric motor;

a flight control system, said flight control system adapted control the attitude of said aerial vehicle while taking off vertically by varying the thrust of the three or more thrust producing elements, said flight control system adapted to control the attitude of said aerial vehicle while in horizontal flight by varying the thrust of the three or more thrust producing elements;

a first right side wing, wherein a first rotor is attached to said first right side wing above said first right side wing, and wherein a second rotor is attached to said first right side wing below said first right side wing, and wherein said first right side wing is pivotally attached to said main vehicle body; and a second left side wing, wherein a third rotor is attached to said second left side wing above said second left side wing, and wherein a fourth rotor is attached to said second left side wing below said second left side wing, and wherein said second left side wing is pivotally attached to said main vehicle body.

2. The aerial vehicle of claim 1 wherein said first right side wing and said second left side wing are adapted to rotate from a first position adapted to vertical take-off and landing to a second position adapted for regular flight.

3. The aerial vehicle of claim 1 wherein said first right side wing is adapted to rotate around a first pivot axis, and wherein said second left side wing is adapted to rotate around a second pivot axis.

4. The aerial vehicle of claim 3 wherein said first pivot axis and said second pivot axis are parallel.

5. The aerial vehicle of claim 3 wherein said first pivot axis and said second pivot axis are coaxial.

6. The aerial vehicle of claim 2 further comprising a control system, said control system adapted to control the attitude of said aerial vehicle during take-off and landing around a first control axis parallel to the ground and a second control axis parallel to the ground by altering the power output of the electric motors of the rotors, wherein said first control axis and said second control axis are perpendicular to each other.

7. The aerial vehicle of claim 6 wherein said control system comprises attitude sensors adapted to sense the attitude of said aerial vehicle.

8. The aerial vehicle of claim 7 wherein said control system is adapted to alter the thrust produced by each rotor in response to attitude sensor data.

\* \* \* \* \*